(12) United States Patent
Vaughan et al.

(10) Patent No.: US 6,815,390 B2
(45) Date of Patent: Nov. 9, 2004

(54) SUPPORTED FLUOROUS BIPHASIC CATALYST SYSTEM

(75) Inventors: Julian F. S. Vaughan, Southampton (GB); Martin G. Pellatt, Wimgorne (GB); James Sherrington, Preston (GB); Eric George Hope, Rugby (GB)

(73) Assignee: Merck Patent GmbH, Darmstadt (DE)

( * ) Notice: Subject to any disclaimer, the term of this patent is extended or adjusted under 35 U.S.C. 154(b) by 114 days.

(21) Appl. No.: 10/332,469

(22) PCT Filed: Jun. 13, 2001

(86) PCT No.: PCT/EP01/06676
§ 371 (c)(1),
(2), (4) Date: Jan. 9, 2003

(87) PCT Pub. No.: WO02/04120
PCT Pub. Date: Jan. 17, 2002

(65) Prior Publication Data
US 2003/0148878 A1 Aug. 7, 2003

(30) Foreign Application Priority Data
Jul. 12, 2000 (EP) .......................................... 001141506

(51) Int. Cl.$^7$ ................................................ B01J 31/00
(52) U.S. Cl. ...................... 502/150; 502/102; 502/103; 502/104; 502/109; 502/159; 502/232; 502/400; 502/402; 502/406; 502/407; 502/514; 422/99; 204/290.06; 546/2
(58) Field of Search ................................ 602/102, 103, 602/104, 109, 150, 159, 232, 400, 402, 406, 407, 514; 546/2; 204/290.06; 422/99

(56) References Cited

U.S. PATENT DOCUMENTS

| | | | |
|---|---|---|---|
| 4,025,459 A | | 5/1977 | Wristers |
| 5,554,664 A | * | 9/1996 | Lamanna et al. .............. 522/25 |
| 5,777,121 A | * | 7/1998 | Curran et al. .................. 546/2 |
| 5,817,221 A | * | 10/1998 | Leddy et al. .......... 204/290.06 |
| 5,859,247 A | * | 1/1999 | Curran et al. .................. 546/2 |
| 6,156,896 A | * | 12/2000 | Curran et al. .................. 546/2 |
| 6,251,689 B1 | * | 6/2001 | Laborde et al. ............. 436/518 |
| 6,372,428 B1 | * | 4/2002 | Nova et al. ..................... 435/6 |
| 6,419,881 B1 | * | 7/2002 | Weinberg et al. ............. 422/99 |
| 6,458,978 B1 | * | 10/2002 | Richter et al. ................ 556/14 |
| 6,664,380 B1 | * | 12/2003 | Barrett et al. ................. 534/15 |

FOREIGN PATENT DOCUMENTS

| | | | |
|---|---|---|---|
| FR | 2634209 | 1/1990 | |
| WO | WO 02/04120 A2 * | 1/2002 | ............ B01J/35/00 |

OTHER PUBLICATIONS

Bergbreiter et al., Chem.Commun., 1997, p. 1531.
Patent Abstracts of Japan, vol. 13 No. 487, Nov. 6, 1989, Abstract of JP 01192710, Mitsui Toatsu Chem. Inc., Aug. 2, 1989.
Database WPI, section Ch, week 198937, Derwent Publications Ltd., AN 1989–266644, Abstract of JP 01192710, Mitsui Toatsu Chem. Inc., Aug. 2, 1989.
Davis M E, "Supported Aqueous–Phase Catalysis," Chemtech, American Chemical Society, 1992, pp. 498–502.
Arhancet J P et al., "Hydroformulation by Supported Aqueous–phase Catalysis: A New Class of Heterogenous Catalysts," Nature, Jun. 8, 1989, pp. 454–455.
Bhattacharyya P et al., "Phosphorus (III) ligands with fluorous ponytails," Journal of the Chemical Society, 1997, pp. 3609–3612.
Case BL et al., "Reusable, Recoverable, Polymeric Supports: Application in Homogeneous Catalysis," Chemical Industries, 1998, vol. 75, pp. 403–414.

* cited by examiner

*Primary Examiner*—Mark L. Bell
*Assistant Examiner*—Jennine M. Brown
(74) *Attorney, Agent, or Firm*—Millen, White, Zelano & Branigan, P.C.

(57) ABSTRACT

The present invention relates to a new catalyst system for fluorous biphasic catalysis processes which comprises functionalized polymeric beads, monodisperse $SiO_2$ or $SiO_2$ flakes associated with the catalyst. These functionalized particles are used as a support for catalysts in fluorous biphasic catalysis (FBC).

20 Claims, No Drawings

SUPPORTED FLUOROUS BIPHASIC CATALYST SYSTEM

This invention relates to a new catalyst system for fluorous biphasic catalysis processes which comprises functionalized plastic beads, monodisperse $SiO_2$ or $SiO_2$ flakes together with the catalyst in the fluorous phase. These functionalized particles are used as a support for catalysts in catalytic processes, especially in fluorous biphasic catalysis (FBC).

There is an increasing interest in the development of new liquid-liquid biphasic catalytic systems. One of the most interesting recent developments in homogeneous catalysis is the concept and application of fluorous biphase catalysis (FBC, I. T. Horváth and J. Rábai, Science, 1994, 266, 72). The principle of FBC is based on the limited miscibility of common organic solvents with perfluorinated compounds. A very attractive aspect of FBC is that it provides, by means of phase separation, an elegant solution of the catalyst/product separation problem associated with homogeneous catalysis. The FBC method shows appealing general features, such as the employment of nontoxic, reusable perfluorocarbons and the easy separation of the catalyst from reactants and products. Moreover, the inertness of perfluorocarbons and the high solubility of oxygen in these fluids would be particularly helpful in oxidation reactions.

Catalytic and stoichiometric reactions can be carried out in the fluorous biphase system, the simplest version being a two-phase mixture consisting of a perfluorcarbon (PFC) and a non-fluorinated solvent. The catalyst (or one of the reagents) is immobilized in the perfluorocarbon phase while the substrate (or substrates) and the product (or products) are dissolved in the organic solvent. Alternatively it is also possible to carry out the reaction under homogeneous conditions, by choosing a PFC/organic solvent couple that shows a thermally controlled miscibility.

In both cases when the reaction is finished the fluorous phase is easily recovered through simple phase separation, and can be reused without further treatment in a new reaction cycle.

The FBC technique is particularly adapted to reactions where the apolar substrates are converted to products of greater polarity, in that these are very easily expelled from the fluorous phase. Other positive aspects of the FBC technique are: the use of non-toxic PFC as a reaction medium, the lack of chemical coordination with catalysts, i.e. the possible improvement of the chemical stability of the homogeneous catalyst due to "site isolation", and the easy separation of the catalyst and/or the exhausted reagents form the products. The future developments of the FBC approach are closely connected to the availability of efficient catalysts having, simultaneously, high solubility in the perfluorinated phase and electronic characteristics like those of analogous products soluble in normal organic solvents.

Successful application of FBC depends on rational design of catalysts that show high affinities to the fluorous phase, that are highly efficient and easy to prepare. Until now, there are some suitable catalysts known such as for example flurous soluble metal catalysts that are based on molecular metal complexes containing conventional ligands modified with fluorinated groups (see Horváth, Acc. Chem. Res., 1998, 31, 641; or de Wolf et al., Chem. Soc. Rev., 1999, 28, 37). The best known such catalysts are perhaps rhodium trialkylphosphine complexes appended with fluorous ponytails such as $[RhH(CO)\{P(CH_2CH_2C_6F_{13})_3\}_3]$. The applicability of these complexes has been convincingly demonstrated by Horváth and Gladysz in the fluorous biphase hydroformylation (see Horváth et al., J. Am. Chem. Soc., 1998, 120, 3133), hydrogenation (see Rutherford et al., Catal. Today, 1998, 42, 381) and hydroboration (see Juliette et al., J. Am. Chem. Soc., 1999, 121, 2696).

Further Pozzi et al., prepared among others fluorous tetraarylporphyrin complexes with cobalt and manganese (see Chem. Commun., 1997, 69 and Tetrahedron, 1997, 52, 6145). Further examples of fluorous oxidation catalysts are Ru and Ni complexes of the fluorinated acetylacetonate anion $\{[(C_7F_{15})C(O)CHC(O)(C_7F_{15})]^-\}$ reported by Klement et al., Angew. Chem. Int. Ed. Engl., 1997 36, 1454.

A fluorous palladium complex $[Pd\{P(C_6H_4C_6F_{13})_3\}_4]$ turned out to be active in a cross-coupling of arylzinc bromides and aryl iodides (Betzemeier and Knochel, Angew. Int. Ed. Engl., 1997 36, 2623).

Bergbreiter and Franchina (Chem. Commun, 1997, 1531) described the synthesis of a fluorous phase soluble fluorocarbon polymer that covalently bind amine-containing reagents and that react with and separate from reagents in aqueous and hydrocarbon solvents.

Fluorous soluble polymer ligands have also been prepared and shown to be active and selective catalysts when combined with rhodium for the fluorous biphase hydroformylation of various olefins by Chen et al., Chem. Comm., 2000, 839.

However, the use of perfluorocarbons may have some disadvantages. Well known are the $C_1$- and $C_2$-fluorocarbons (freons) which are greenhouse gases and have become a major environmental problem because of their inertness. The higher perfluoroalkanes have lower vapor pressures and might therefore cause less environmental problems than their smaller chain analogues. About the impact, however, of longer perfluoroalkanes on the greenhouse effect, less is known. Therefore, it would be desirable and necessary to reduce the volume of the perfluorocarbons (PFC).

Furthermore, there is still a great need of suitable catalyst systems that are highly efficient, highly soluble in the fluorous phase, easy to prepare and easily recovered as the future developments of the FBC approach are closely connected to the availability of efficient catalysts having those advantages.

Surprisingly it has been found that functionalized plastic beads, monodisperse $SiO_2$ or $SiO_2$ flakes together with the catalyst in the fluorous phase are highly suitable as a new catalyst system for fluorous biphasic catalysis processes and for catalytic processes in general.

Thus, the subject of the present invention is a new catalyst system for fluorous biphasic catalysis processes comprising functionalized plastic beads, monodisperse $SiO_2$ or $SiO_2$ flakes associated with the catalyst in the fluorous phase.

Subject of this invention is also the use of plastic beads, monodisperse $SiO_2$ or $SiO_2$ flakes which are functionalized, as a support material for catalysts in catalytic processes.

The plastic beads, the monodisperse $SiO_2$ particles or the $SiO_2$ flakes are initially functionalized to facilitate interaction with the corresponding catalyst. This allows the chemistry to be performed in a thin film of liquid adhering to the surface of the beads or $SiO_2$ particles. As a result, a vastly reduced volume of the fluorinated solvent—which is expensive and not environmentally friendly—is required whilst continuing to facilitate a continuous process and to maintain the advantages of the FBC approach.

As mentioned before Bergbreiter and Franchina (Chem. Commun, 1997, 1531) and Chen et al., Chem. Comm., 2000, 839 described a similar approach using a fluorous soluble polymer catalyst or a fluorpolymer support for fluorous phase chemistry. In these cases the reagent is either covalently bonded (Bergbreiter) or already contains ligands which only require the introduction of a metal (Xiao). However, in the case of the support material of the present invention, the full catalyst (i.e. metal plus ligands) are added later. This allows variations to both the metal and ligands using one support material.

Furthermore, the polymeric beads of the present invention have no chemical bond between the support material and the catalyst.

Unlike the polymers of the prior art, the beads or the $SiO_2$ particles are not soluble in the fluorous layer—they associate with it due to the functionality on the surface. This decreases the incidence of emulsion formation when the hydrocarbons and fluorocarbons mix which is a disadvantage of the prior art approach.

Also, the separation of the plastic beads or the $SiO_2$ particles is easily done i.e. by filtration.

The most important advantage or progress in view of the whole prior art concerning FBC is the following: due to the large surface area of the beads and the non-porous silicas the amount of fluorous solvent which is expensive and may have environmental issues attached, can be vastly reduced as only a film is required on the surface.

As regards the plastic beads any polymeric beads which show a uniform size and have a varying diameter ranging from 2 000 nm to 25 000 nm may be used. Preferably plastic beads based on polymers like polystyrene or a copolymer of polyamide/polyethylene glycol are used.

The polymers may already have groups like phenylene or substituted phenylene attached.

The following polymer beads are for example commercially available and preferably used in the present invention:

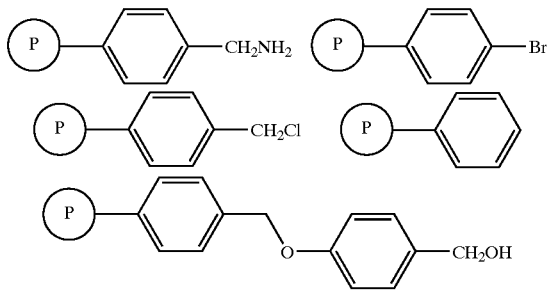

These polymers have to be further functionalized according to this invention.

Functionalized non-porous $SiO_2$ flakes and especially functionalized monodisperse $SiO_2$ particles are preferably used as the support material according to the present invention. The basic silica particles are commercially available from Merck KGaA (Darmstadt, Germany), monodisperse $SiO_2$ particles are known under the tradename Monospher®.

Monospher® is uniform-sized spherical silica, in particle sizes in the range of 20 nm to 25 000 nm, preferably of 100 to 1 000 nm. The spherical silica is solid, non-porous, and free from agglomeration. The surface can also be modified to obtain special properties. For example hydrophobic particles can be prepared or other organic functional groups like halides, epoxides, amines etc. can be bound to the silica particles. These functional groups are available for further chemical reactions in particular applications.

In a further preferred embodiment of this invention monodisperse $SiO_2$ particles are used which have additionally a magnetic layer underneath the outermost silica layer. In this case the Monospher® is covered with magnetite and then covered with another silica layer so that the surface is the same as the original Monospher® surface layer and can be functionalized in the same way.

These magnetic silica beads are very easily separated from reactions by applying a magnetic field. Therefore, they may be advantageously applied here as an aid to catalyst recovery. The magnetic monodisperse $SiO_2$ particles have a varying diameter ranging from 50 nm to 25 000 nm, preferably from 50 to 1 500 nm.

The preparation of those magnetic monodisperse $SiO_2$ particles are described in the patent application DE 196 38 591.1.

The plastic beads, monodisperse $SiO_2$ or non-porous $SiO_2$ flakes are functionalized with a) partially fluorinated chains, or
b) perfluoro chains, or
c) hydrocarbon chains, or
d) branched systems containing perfluoro, hydrocarbon or partially fluorinated chains, each having $C_1$ to $C_{30}$ atoms, and wherein groups like cycloalkyl or aromatic rings—optionally being substituted by one or more fluorine atoms or fluorinated groups—may be present.

Preferably, partially fluorinated or perfluoro chains and branched systems containing perfluoro, hydrocarbon or partially fluorinated chains having 1 to 30 C atoms, preferably 3 to 20 C atoms, are used. The C—F bonds can be anywhere along the chain and at one specific C atom all the bonds could be C—F or C—H or there could be a combination of C—F and C—H bonds. Also, the branching could occur anywhere along the chain and could vary in length.

Preferably, groups like e.g. cyclopropyl, cyclobutyl, cyclopentyl, cyclohexyl, cycloheptyl and cyclooctyl or aromatic rings which further may be substituted, may be present.

Thus, functionalization groups like —$CF_3$, —$CH_2F$, —$CHF_2$, —$C_2F_5$, —$CH_2CF_3$, —$C_3F_7$, —$(CH_2)_2CF_3$, —$C_4F_9$, —$(CH_2)_2(CF_2)CF_3$, —$(CH_2)_3CF_3$, —$(CH_2)_2(CHF)CF_3$, —$C_5F_{11}$, —$(CH_2)_2(CF_2)_2CF_3$, —$C_6F_{--}$, —$(CH_2)_2(CF_2)_3CF_3$, —$(CH_2)_2(CF_2)_4CF_3$, —$C_7F_{15}$, —$(CH_2)_2(CF_2)_5CF_3$, —$(CH_2)_2(CF_2)_9CF_3$, —$(CH_2)_3(CF_2)_4CF_3$, —$(4$-$F_{13}C_6)$—$C_6H_4$, —$(4$-$C_7F_{15}CH_2O)$—$C_6H_4$, —$[4$-$C_8F_{17}(CH_2)_3O$ ]—$C_6H_4$, —$(CH_2)_2(CF_2)_2(CF_3CF_2CF_2)CF(CF_2)_2CF_3$ are preferred.

In all these cases of chains and branches the presence of aromatic and cycloalkyl groups as mentioned above is possible and these can be fluorinated, partially fluorinated and non-fluorinated, too.

It is also possible to functionalize the Monospher® with hydrocarbons. Thus, systems utilising Monospher® functionalized with hydrocarbon chains and a catalyst with perfluoroalkyl chains or visa versa could be envisaged. That means that the catalyst may also have hydrocarbon chains as ligands.

The hydrocarbon chains may be straight or branched, and they are therefore preferably methy, ethyl, n-propyl, butyl, pentyl, hexyl, heptyl, octyl, nonyl, i-propyl, sec-butyl, tert.-butyl, i-butyl, 1-methylbutyl, 2-methylbutyl, 3-methylbutyl, 1-methylpentyl, 2-methylpentyl, decyl, undecyl or dodecyl, and further also 2,2-dimethylpropyl, 1-ethylpropyl, 3-methylpentyl, 4-methylpentyl, 1,1-dimethylpropyl, 1,2-dimethylpropyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, tridecyl, tetradecyl, pentadecyl, hexadecyl, heptadecyl, octadecyl, nonadecyl or eicosyl.

Preferably, groups like e.g. cyclopropyl, cyclobutyl, cyclopentyl, cyclohexyl, cycloheptyl and cyclooctyl or aromatic rings which further may be substituted, may be also present in the above mentioned alkyl groups. Preferred groups are for example, 2-cyclopentylbutyl, 2-cyclohexylpropyl, 2-phenylpropyl or 3-cyclohexylpentyl, 3-phenylpentyl or 2-phenylbutyl. The cycoalkyl or aromatic groups may be further substituted by any groups that do not disturb the catalytic reactions, preferably substituents like alkyl groups, partially fluorinated groups or perfluoralkyl groups are present.

In a preferred embodiment of this invention the 1H,1H, 2H,2H-perfluorooctyl-group is used as the functionalization group.

Another object of this invention is the possibility to functionalize the Monospher® with the catalyst itself. Then, there is a covalent chemical bond between the monodisperse $SiO_2$ and the catalyst. However, this requires the Monospher® to have for example perfluoroalkyl chains so that it is fluorous soluble as well as the catalyst attached.

The catalyst is attached by reacting it with the SiOH (or SiONa groups after reacting with NaH) on the Monosph®er surface.

The functionalization of the support material occurs according to known processes following established routes described for example by Anspach et al., in J. Chromatography, 1988, 457,195.

In general the procedure is carried out by activating the silicas first by heating under vacuum to high temperature (e.g. 200° C.), then suspending the dehydrated silicas in an appropriate solvent (organic solvent or water), adding an excess of the corresponding silane reagent (for example 1H, 1H, 2H, 2H-perfluorooctyltriethoxysilane) and heating under reflux for several hours until the reaction is completed. The resultant functionalized silicas are then purified according to common methods for separation and purification and finally dried under vacuum.

The number of surface silanols per gram of material is normally calculated assuming a true solid density and perfect spherical geometry.

This general way for functionalization is also used to modify the plastic beads.

A great advantage is that the coating of organic materials on the silica particles or the plastic beads can be tailored to specific catalytic systems (i.e. fluorocarbon or hydrocarbon or both, varying chain length and the functionality the chain contains).

These functionalized plastic beads or silica particles are then used as a support material for catalysts in the fluorous phase in fluorous biphasic catalysis processes. This is also an object of the present invention.

The functionalized surface of the silicas or the plastic beads allows the catalysts—usually used in these catalytic processes—to associate with the support material by an interaction of the catalyst ligands and the coating of the silica or plastic beads supports. In this case there are no permanent chemical bonds and the support materials can be used again.

The facilitated chemisorption/physisorption of the catalysts onto the surface of the support materials allows the chemistry of the catalysis to be performed in a thin film of liquid adhering to the surface of the silica particles or the plastic beads. As a result, a vastly reduced volume of the fluorinated solvent is required whilst continuing to facilitate a continuous process and to maintain the advantages of the FBC approach.

As this technique could be applied to any catalytic reaction, not only for the FBC approach, a further object of the present invention is the use of plastic beads, monodisperse $SiO_2$ or $SiO_2$ flakes which are functionalized, as a support material for catalysts in catalytic processes in general.

It is possible for example to use the new catalytic system in the palladium catalysed Heck reaction.

And a further object of this invention is especially the use of plastic beads, monodisperse $SiO_2$ or $SiO_2$ flakes which are functionalized according to this invention, as a support agent for catalysts, preferably fluorous catalysts, in fluorous biphasic catalysis (FBC).

As regards the catalysts, potentially, any catalyst could be used which are suitable for catalytic reactions.

Preferably, catalysts are used which are suitable for catalytic reactions like catalytic hydroformylation, hydroboration, C—C coupling, epoxidation, oxidation, reduction and alkylation.

Especially preferred for fluorous biphasic catalysis are catalysts having a fluorous ponytail containing complex. That means that the catalysts in charge are functionalized with one or several perfluoroalkyl groups to render these catalysts soluble in a fluorous phase. Most often, perfluorohexyl and perfluorooctyl groups are used.

Such catalysts are for example phosphines having a certain number of perfluoroalkyl tails ($R_F$) of appropriate length. An alkyl spacer can be interposed between the donor atom and the $R_F$ substituents, in order to shield phosphorus from the strong electron-withdrawing of the latter. This kind of ligand proved to be very efficient in fluorous-organic catalytic reactions such as the hydroformylation of alkenes (Horváth et al., J. Am. Chem. Soc. 1998, 120, 3133). Other catalysts are for example fluorous tetraarylporphyrin complexes with cobalt and manganese, Ru and Ni complexes of the fluorinated acetylacetonate anion $\{[(C_7F_{15})C(O)CHC(O)(C_7F_{15})]^-\}$, or a fluorous palladium complex $[Pd\{P(C_6H_4C_6F_{13})_3\}_4]$, The known and preferred catalysts for the FBC approach given in the following are intended only as examples:

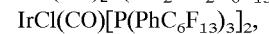
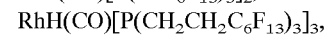
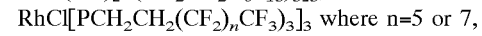
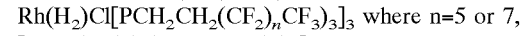
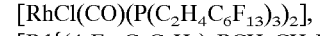
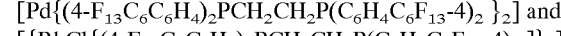

These catalysts are preferably used in the present invention.

The perfluorinated solvents are preferably chosen from the group consisting of perfluoroalkanes, perfluoroalkene, perfluoroethers or—amines, such as for example n—$C_6F_{14}$, $C_8F_{17}Br$, 1,3-dimethylperfluorocyclohexane, perfluormethylcyclohexane or perfluordimethylether.

As the organic solvent the typical organic solvents normally used in organic chemistry may be chosen. Preferred solvents are for example hexane, toluene, benzene, alcohols, dimethylsulfoxide or ethers like tetrahydrofuran.

The new catalyst system is prepared by mixing the functionalized support material with a suitable catalyst dissolved in a perfluorcarbon. The ratio R of the functionalized support material to the catalyst is usually in the range of R=1.0 to 10.0. Especially preferred is the ratio R=5.0.

Once the catalyst is associated with the support material (after stirring for several hours) it can be used immediately for the desired catalytic process or may be filtered off and isolated for use with a different system or at a later date.

With the new catalyst system according to this invention there is a new approach available to optimize catalytic processes based on the principles of the fluorous biphasic catalysis.

The use of the functionalized plastic beads or nonporous silicas as a support material for the corresponding catalyst has the following advantages.

The functionalization of the beads or $SiO_2$ particles facilitates the interaction with the perfluoro groups of the corresponding catalyst and the chemistry of the catalysis is performed in a thin film of liquid adhering to the surface of the beads or $SiO_2$ particles. As a result, a vastly reduced volume of the fluorinated solvent—which is expensive and not environmentally friendly—is required whilst continuing to facilitate a continuous process and to maintain the advantages of the FBC approach.

Furthermore, the amount of catalyst leaching in the non-fluorous phase is highly reduced as a result of the very good interaction between the support material and the catalyst. The distribution of the fluorous catalyst in the two phases is also important from an economic point of view. A fluorous catalyst might be more expensive than a non-fluorous, however, if the catalyst can be fully recovered and is not leaching in the non-fluorous solvent—and that is the case in the present catalyst system—it will be cheaper in the long term.

Especially in case of the magnetic Monosphers® the recovery is very easy and efficient.

A further advantage is that there is a broad variety of different catalyst systems available. The coating (functionalization) of the support materials can be tailored to specific catalytic systems. The product preparation is simple and uses technologies known to those skilled in the art.

The support materials could be functionalized with partially fluorinated chains, perfluoro chains, hydrocarbon chains, or branched systems containing perfluoro, hydrocarbon or partially fluorinated chains as described above.

The ligand on the catalyst could also have hydrocarbon groups, that means systems utilising Monospher® functionalized with hydrocarbon chains and a catalyst with perfluoroalkylchains or systems utilising Monospher® functionalized with partially, fluorinated or perfluorinated groups and a catalyst with hydrocarbon chains or partially fluorinated groups could be envisaged.

Thus, there are many possibilities and the catalytic system can be adapted to specific catalytic processes.

Furthermore, this technique may be applied to any catalytic reaction like catalytic hydroformylation, hydroboration, C—C coupling, epoxidation, oxidation, reduction and alkylation and others.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above and below are hereby incorporated by reference.

The following examples shall illustrate the present invention.

EXAMPLES

A) Functionalization of Monospher®

The Monospher® (250 nm diameter, from Merck KGaA, Darmstadt, Germany) was activated by heating under vacuum to 200° C. The Monspher® was then loaded with an excess of 1H, 1H, 2H, 2H-perfluorooctyltriethoxysilane into flame dried glass ware under dinitrogen and refluxed in dry hexane for 72 hours.

The resultant functionalized monospher (FM) was purified by stirring in a mixture of toluene and 1,3-dimethylperfluorocyclohexane (PP3). On separation the organic layer was decanted off, the fluorous layer filtered and the residue washed with large amounts of hexane. The functionalized monospher was dried unter vacuum for a further 36 hours and weighed. The increase in mass suggested around 45% coverage.

B) Testing the Preference for Fluorous Solvents

Table 1 shows the results of experiments testing the preference of functionalized monospher® (FM) in comparison to unmodified Monospher® in a variety of biphasic systems.

TABLE 1

| Biphase | FM | Monospher ® |
|---|---|---|
| $PP3/CH_2Cl_2$ | PP3 | $CH_2Cl_2$ |
| $PP3/C_6H_5CH_3$ | PP3 | $C_6H_5CH_3$ |
| PP3/MeOH | PP3 | MeOH |
| $PP3/C_6H_5F$ | PP3 | $C_6H_5F$ |
| $C_6H_5CH_3/H_2O$ | $C_6H_5CH_3$ | $H_2O$ |

The perfluoroalkyl functionalized monospher showed a clear preference for highly fluorous solvents.

C) Preparation of a Catalyst System According to the Invention

The functionalized monospher prepared in example A) was used as a support for a fluorous ponytail containing complex. 50 mg of the highly colored, fluorous soluble $IrCl(CO)[P(PhC_6F_{13})_3]_2$ was dissolved in 1,3-dimethylperfluorocyclohexane and added to an equal weight of functionalized monospher in a 100 ml flask. The mixture was stirred for 3 hours. Then the catalyst is associated with the support material and can be filtered off, isolated and used as for any catalytic process.

What is claimed is:

1. A catalyst system for fluorous biphasic catalysis processes comprising functionalized plastic beads, and monodisperse $SiO_2$ particles or $SiO_2$ flakes together with a catalyst in a fluorous phase.

2. A system according to claim 1, wherein the monodisperse $SiO_2$ particles have a magnetic layer underneath an outermost silica layer.

3. A system according to claim 1, wherein the monodisperse $SiO_2$ particles have a diameter of 20 nm to 25 000 nm.

4. A system according to claim 2, wherein the monodisperse $SiO_2$ particles have a diameter of 50 nm to 25 000 nm.

5. A system according to claim 1, wherein the plastic beads are polymer beads.

6. A system according to claim 5, wherein attached to the polymer beads are phenylene or substituted phenylene groups.

7. A system according to claim 5, wherein the polymer beads have a diameter of 2 000 nm to 25 000 nm.

8. A system according to claim 1, wherein the plastic beads, and the monodisperse $SiO_2$ particles or $SiO_2$ flakes are functionalized with
   a) partially fluorinated chains,
   b) perfluoro chains,
   c) hydrocarbon chains, or
   d) branched systems containing perfluoro, hydrocarbon or partially fluorinated chains,
   wherein each of a), b), c) and d) have 1–30 carbon atoms, and optionally contain one or more cycloalkyl or aromatic rings, which are optionally substituted by one or more fluorine atoms or fluorinated groups.

9. A system according to claim 1, wherein the monodisperse $SiO_2$ particles or $SiO_2$ flakes, optionally having perfluoro or partially fluorinated groups on their surface, are functionalized with the catalyst.

10. A system according to claim 1, wherein the catalyst is soluble in the fluorous phase.

11. A system according to claim 10, wherein the catalyst a catalytic hydroformylation, hydroboration, C—C coupling, epoxidation, oxidation, reduction or alkylation promoting catalyst.

12. A system according to claim 1, wherein the catalyst is a fluorous ponytail containing complex.

13. A system according to claim 12, wherein the catalyst is selected from the group consisting of $IrCl(CO) [P(PhC_6F_{13})_3]_2$, $RhH(CO)[P(CH_2CH_2C_6F_{13})_3]_3$, $RhCl[PCH_2CH_2(CF_2)_nCF_3)_3]_3$ where n=5 or 7, $Rh(H_2)Cl[PCH_2CH_2(CF_2)_nCF_3)_3]_3$ where n=5 or 7, $[RhCl(CO)(P(C_2H_4C_6F_{13})_3)_2]$, $[Pd\{(4-F_{13}C_6C_6H_4)_2PCH_2CH_2P(C_6H_4C_6F_{13}-4)_2\}]$ and $[\{RhCl\{(4-F_{13}C_6C_6H_4)_2PCH_2CH_2P(C_6H_4C_6F_{13}-4)_2\}\}_2]$.

14. A method of fluorous biphasic catalysis comprising contacting a system according to claim 1 with a reactant to be catalyzed.

15. A method according to claim 14, wherein the plastic beads, and the monodisperse $SiO_2$ particles or $SiO_2$ flakes are functionalized with a) partially fluorinated chains, b) perfluoro chains, c) hydrocarbon chains, or d) branched systems containing perfluoro, hydrocarbon or partially fluorinated chains, wherein each of a), b), c), and d) have 1–30 carbon atoms, and optionally contain one or more cycloalkyl or aromatic rings, which are optionally substituted by one or more fluorine atoms or fluorinated groups.

16. A method according to claim 14, wherein the monodisperse $SiO_2$ particles have a magnetic layer underneath an outermost silica layer.

17. A system according to claim 5, wherein the polymer is polystyrene or a copolymer of polyamide/polyethylene glycol.

18. A system according to claim 1, wherein the plastic beads and/or the monodisperse $SiO_2$ particles are not soluble in the fluorous phase.

19. A system according to claim 1, wherein the plastic beads are functionalized with $—CF_3$, $—CH_2F$, $—CHF_2$, $—C_2F_5$, $—CH_2CF_3$, $—C_3F_7$, $—(CH_2)_2CF_3$, $—C_4F_9$, $—(CH_2)_2(CF_2)CF_3$, $—(CH_2)_3CF_3$, $—(CH_2)_2(CHF)CF_3$, $—C_5F_{11}$, $—(CH_2)_2(CF_2)_2CF_3$, $—C_6F_{13}$, $—(CH_2)_2(CF_2)_3CF_3$, $—(CH_2)_2(CF_2)_4CF_3$, $—C_7F_{15}$, $—C_8F_{15}$, $—(CH_2)_2(CF_2)_5CF_3$, $—(CH_2)_2(CF_2)_9CF_3$, $—(CH_2)_3(CF_2)_4CF_3$, $—(4-F_{13}C_6)—C_6H_4$, $—(4-C_7F_{15}CH_2O)—C_6H_4$, $—[4-C_8F_{17}(CH_2)_3O]—C_6H_4$, or $—(CH_2)_2(CF_2)_2(CF_3CF_2CF_2)CF(CF_2)_2CF_3$ groups.

20. A system according to claim 8, wherein the plastic beads and the $SiO_2$ particles or $SiO_2$ flakes are functionalized with $—CF_3$, $—CH_2F$, $—CHF_2$, $—C_2F_5$, $—CH_2CF_3$, $—C_3F_7$, $—(CH_2)_2CF_3$, $—C_4F_9$, $—(CH_2)_2(CF_2)CF_3$, $—(CH_2)_3CF_3$, $—(CH_2)_2(CHF)CF_3$, $—C_5F_{11}$, $—(CH_2)_2(CF_2)_2CF_3$, $—C_6F_{13}$, $—(CH_2)_2(CF_2)_3CF_3$, $—(CH_2)_2(CF_2)_4CF_3$, $—C_7F_{15}$, $—C_8F_{15}$, $—(C_2)_2(CF_2)_5CF_3$, $—(CH_2)_2(CF_2)_9CF_3$, $—(CH_2)_3(CF_2)_4CF_3$, $—(4-F_{13}C_6)—C_6H_4$, $—(4C_7F_{15}CH_2O)—C_6H_4$, $—[4-C_8F_{17}(CH_2)_3O]—C_6H_4$, or $—(CH_2)_2(CF_2)_2(CF_3CF_2CF_2)CF(CF_2)_2CF_3$ groups.

* * * * *